UNITED STATES PATENT OFFICE.

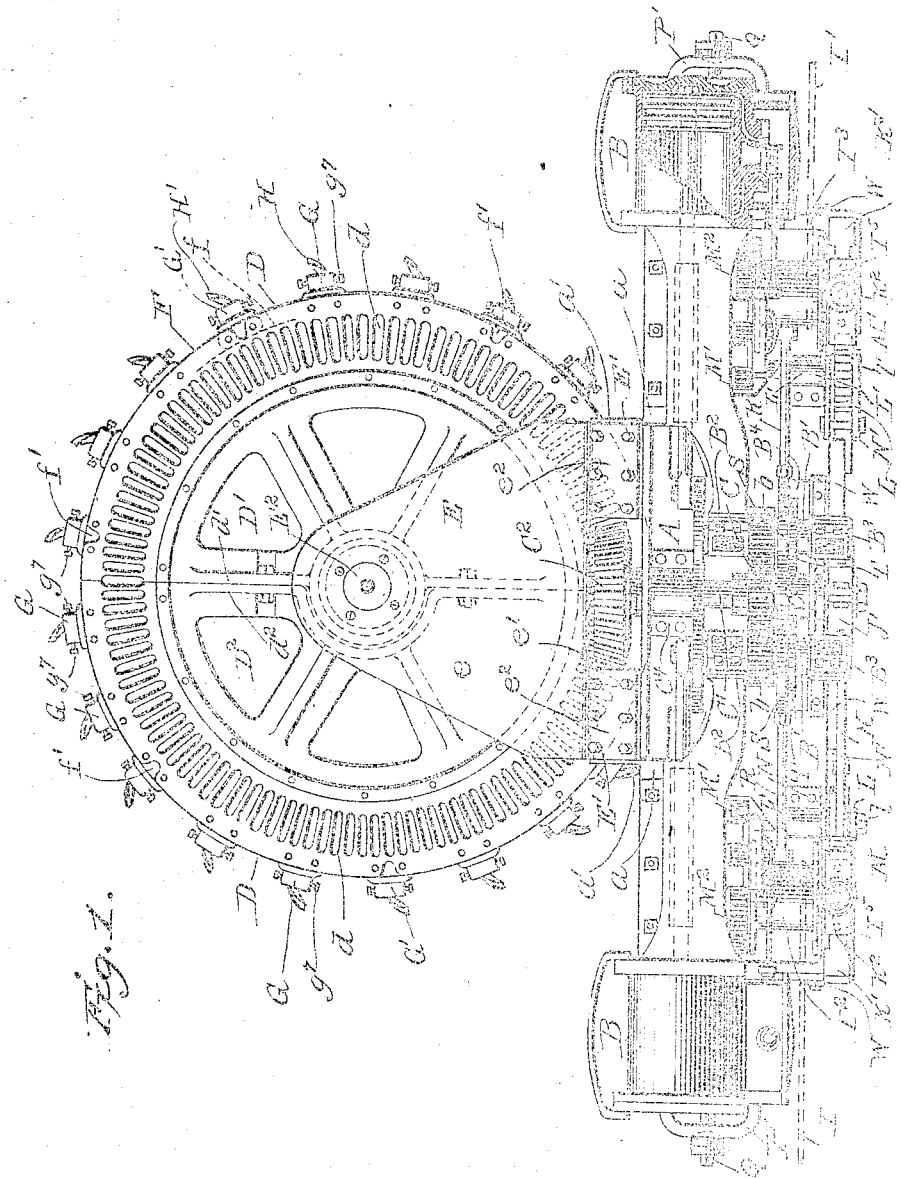

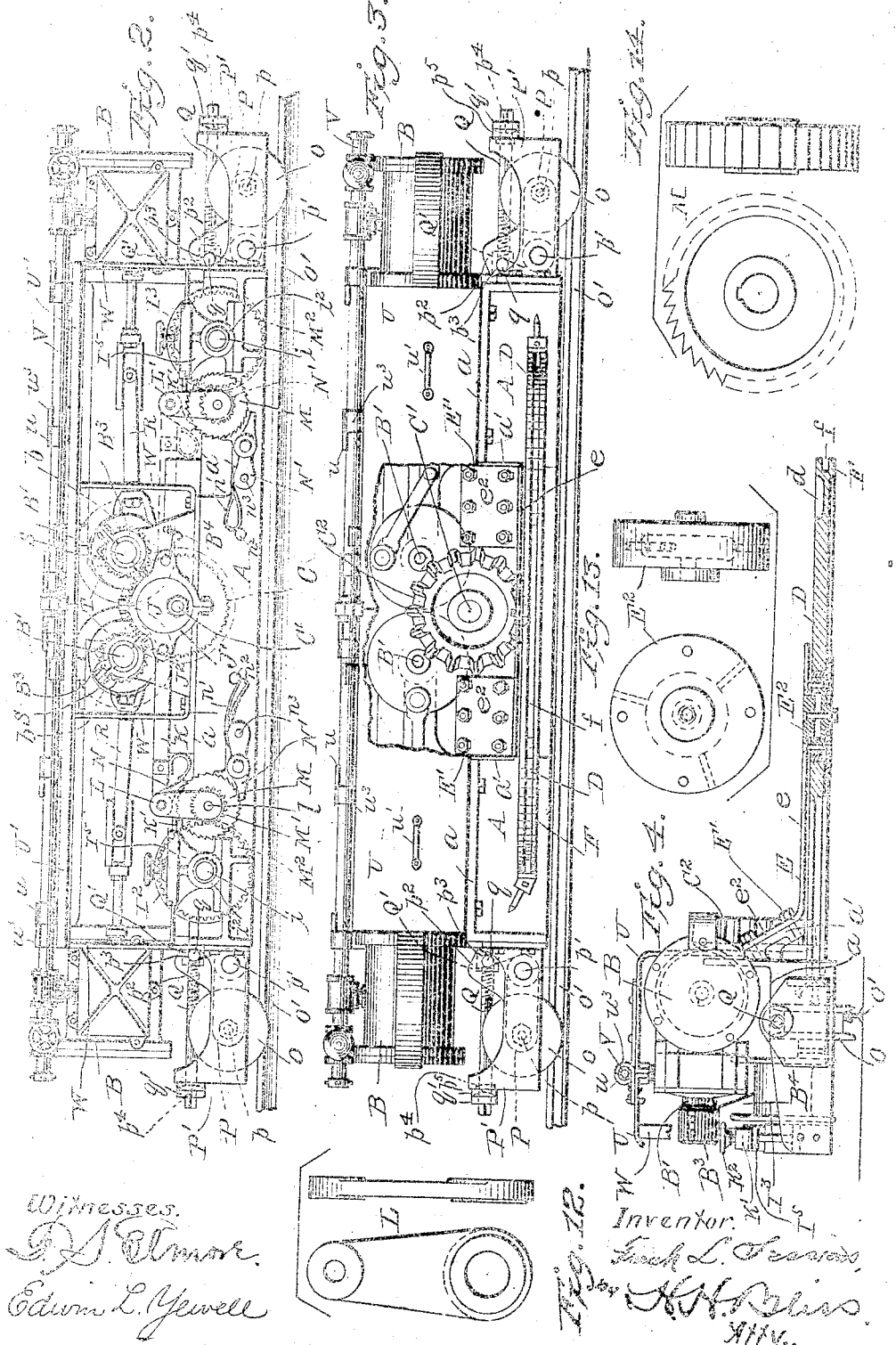

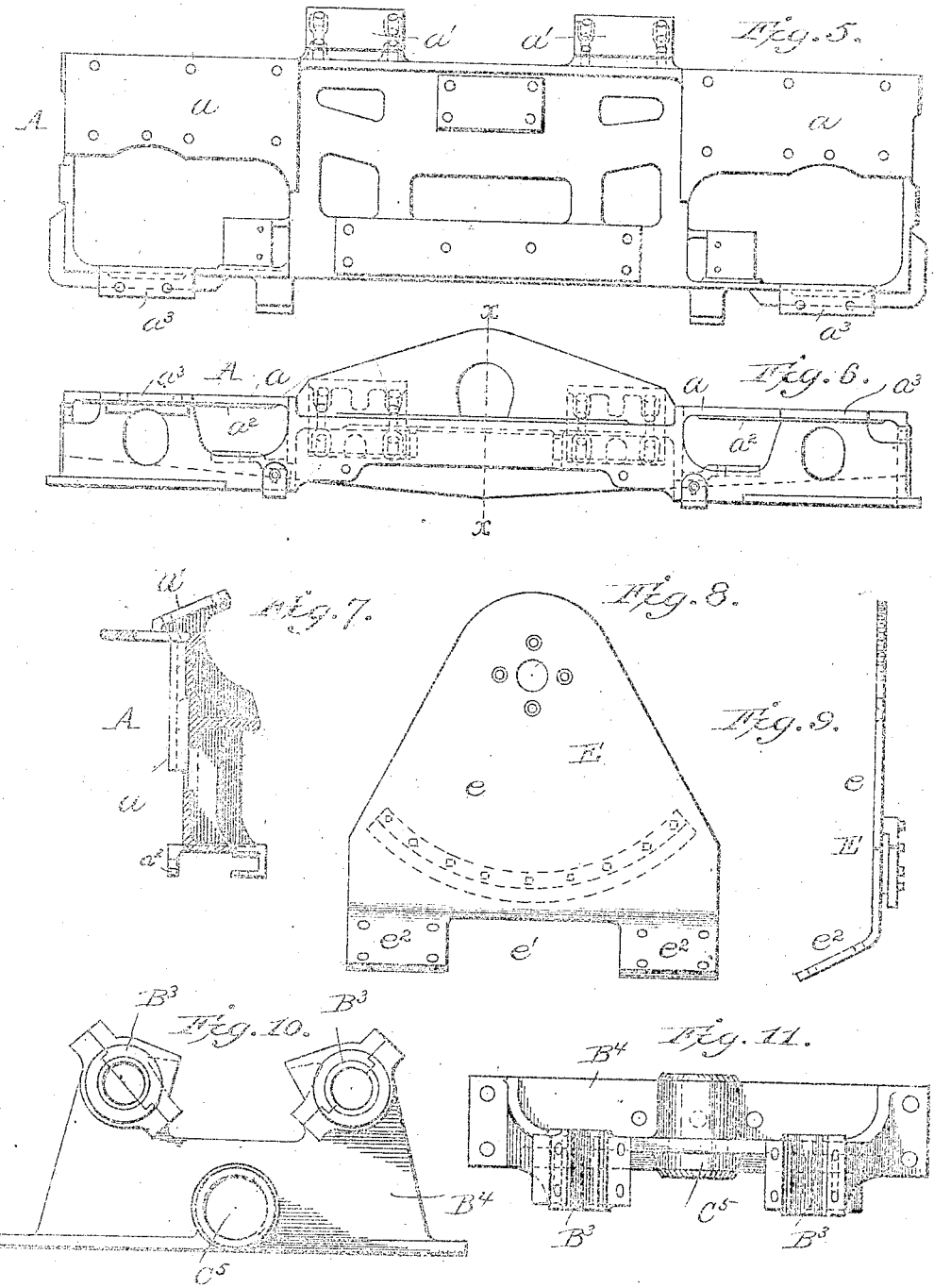

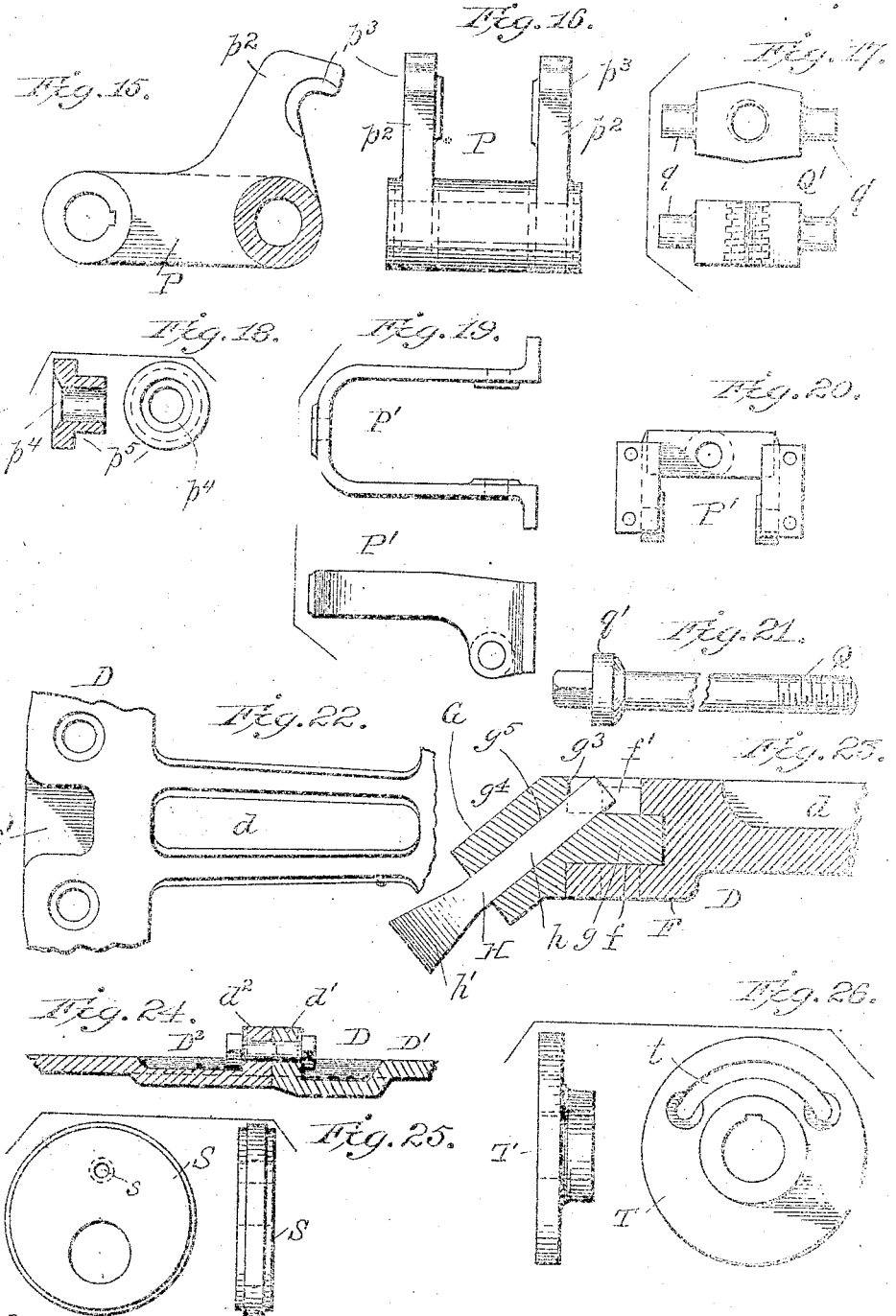

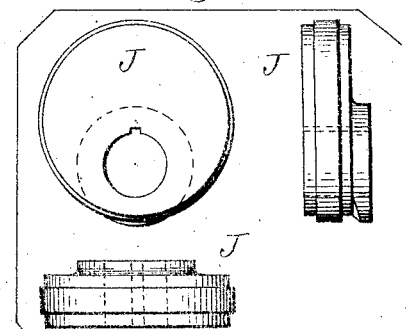
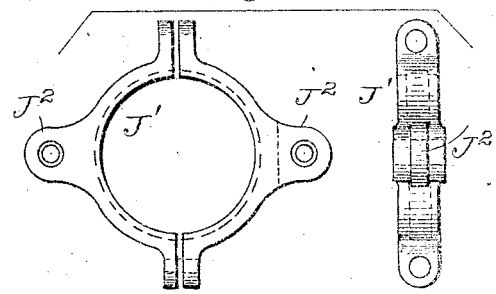
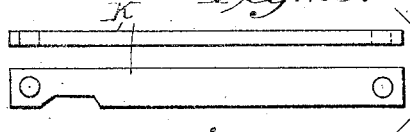
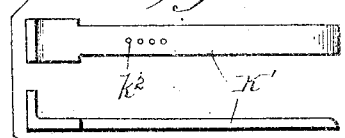
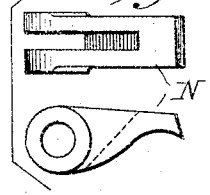
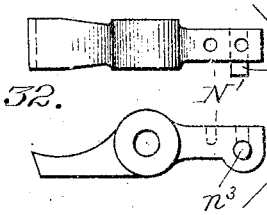
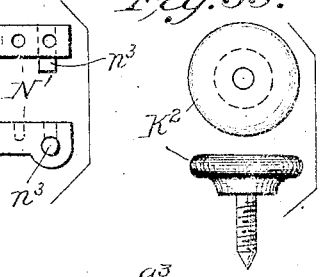
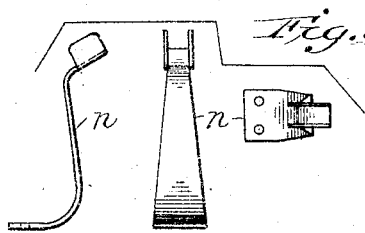
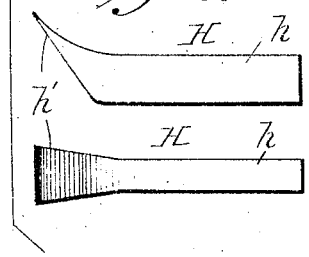
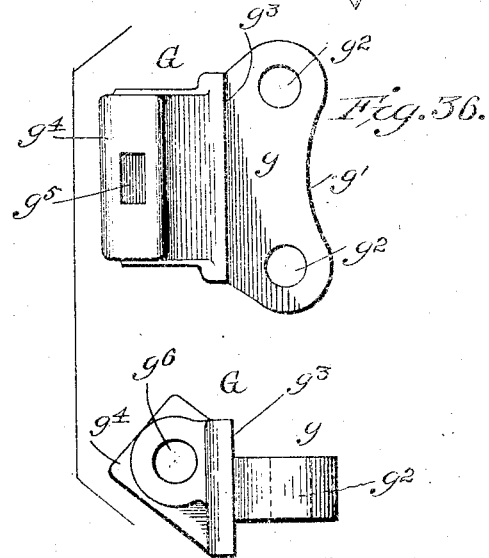

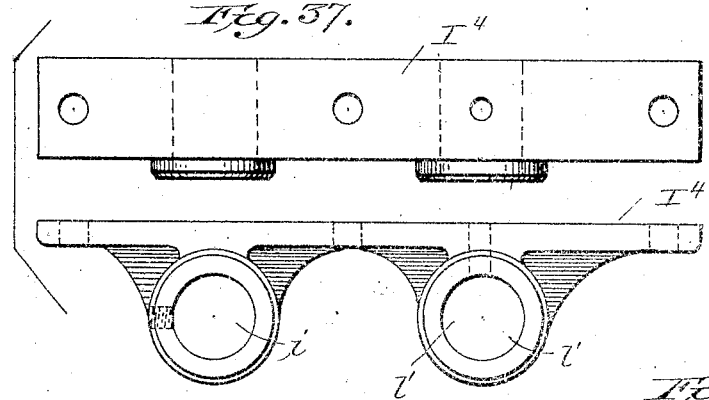
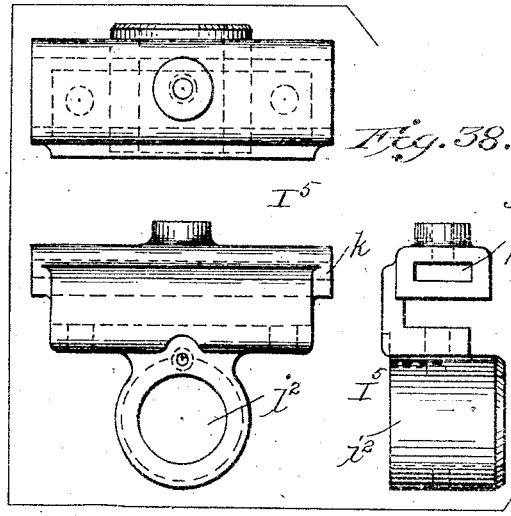
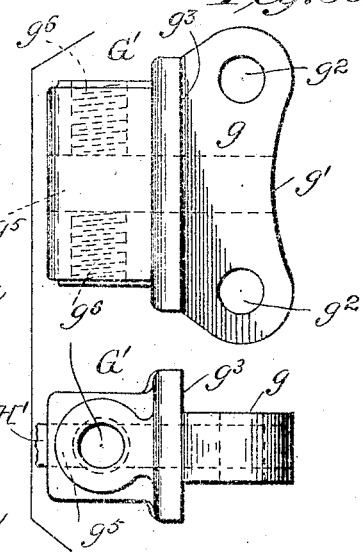
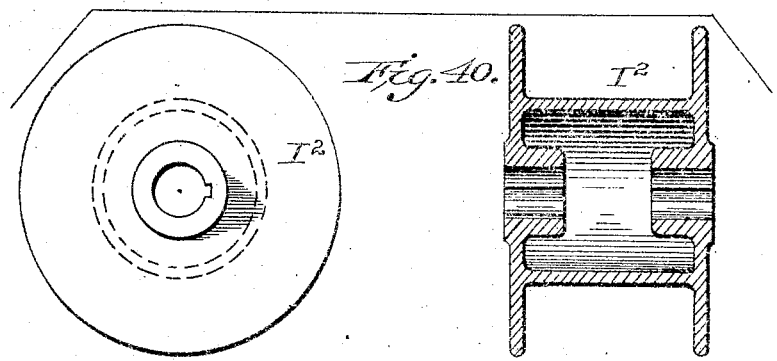

FRANK L. SESSIONS, OF COLUMBUS, OHIO, ASSIGNOR, BY MESNE ASSIGNMENTS, TO THE JEFFREY MANUFACTURING COMPANY, A CORPORATION OF OHIO.

MINING-MACHINE.

975,468.

Specification of Letters Patent. Patented Nov. 15, 1910.

Application filed November 16, 1903. Serial No. 181,431.

*To all whom it may concern:*

Be it known that I, FRANK L. SESSIONS, a citizen of the United States, residing at Columbus, in the county of Franklin and State of Ohio, have invented certain new and useful Improvements in Mining-Machines, of which the following is a specification, reference being had therein to the accompanying drawing.

This invention relates to improvements in mining machines, and has for its purposes the attainment of a number of important ends which will be fully understood from the drawings and description below.

Figure 1 is a plan view of a machine embodying my improvements, the cover being removed. Fig. 2 is a side elevation from the outer side. Fig. 3 is a side elevation from the inner side. Fig. 4 is an end elevation. Fig. 5 is a plan view of the main frame, detached. Fig. 6 is a side elevation thereof. Fig. 7 is a vertical section on the line $x$—$x$ of Fig. 6. Fig. 8 is a plan view of the cutter-wheel-carrying frame or plate. Fig. 9 is an edge view of the same. Fig. 10 is a side elevation; and Fig. 11 a plan view of the brackets or standards which support the crank shaft. Figs. 12 to 40 show details.

In the drawings there is shown a bed-frame which as a whole is indicated by A. At the ends it is provided with plate or platform-like parts $a$ $a$ upon which are secured the engines.

$a'$—$a'$ are laterally projecting lugs on the frame, the purpose of which will be hereinafter described. There are two engine cylinders B—B. They are in line with each other, and each is provided with an independent crank shaft B'—B' and have their crank pins arranged at an angle of 90 degrees to each other with reference to the axis of the main driving shaft. These crank shafts B'—B' are mounted at their inner ends in bearings B²—B² on the engine frame and having their outer ends mounted in bearings B³—B³ in a bearing block or frame B⁴ which is rigidly secured to the frame A. Each crank shaft has a pinion $b$ which meshes with a gear wheel C on a main shaft C', this being the principal power shaft which conveys the power to the cutting apparatus and also to the feeding mechanism. It is mounted near its inner end in a bearing C⁴ which is rigidly secured to the frame A and at its outer end in a bearing C⁵ carried by the bearing block or frame B⁴. The cutting apparatus consists of a relatively large wheel or disk D. It is formed with gear sockets or teeth at $d$ with which engages the bevel wheel C² on the shaft C'. The wheel is supported by a plate or frame E which is bolted to the main frame at E'. This plate has the horizontal part $e$ extending out over the cutter wheel, there being a recess $e'$ to permit the engagement of the wheel C² with the cutter wheel, the portions $e^2$ of the plate E on either side of the said recess being inclined as represented in Figs. 8 and 9 and adapted to rest upon and be rigidly secured to the inclined lugs $a'$—$a'$ on the frame.

The cutter wheel is made in two halves D' D², each half having a rib or flange at $d'$ $d^2$ adapted to take horizontal bolts to secure the two parts of the wheel together. The mounting of the wheel on the frame may be accomplished by means of a stub shaft E² similar in construction to the one shown in my application for mining machine, Ser. No. 43,319, filed Jan. 15, 1901 and similarly secured to the supporting plate E.

The peripheral part F of the wheel is formed with a groove $f$ which extends continuously around the wheel and with sockets or cut-away portions at $f'$ to permit the upward or downward passage of the heel ends of the cutter bits, as shown in Figs. 1, 22 and 23. The cutter-bits are carried in block-like holders of which there are preferably two sorts, one being shown at G and the other at G'. That at G, as shown in Fig 36, has a seating plate $g$ with a curved edge $g'$ and bolt apertures $g^2$, this plate $g$ being adapted to fit in the groove $f$ in the cutter wheel; and then outside of the periphery of the wheel the cutter holder has a shouldered flange $g^3$ and a cutter socket $g^4$, the metal of which is arranged at something of an inclination to the horizontal, the cutter cavity proper being shown at $g^5$. At $g^6$ there is a set screw aperture formed in it. The cutter is shown at H, it having a shank $h$ and an expanded sharpened end $h'$. The shank $h$ is seated in the cavity $g^5$ and secured in place by the set screw $g^7$ in the threaded aperture $g^6$. Some of the cutter-carriers are placed so that the cutter bit is inclined upward, outwardly, and others are placed so that the bits are inclined downwardly, outwardly. The cut-out or recessed parts f' in the periphery of the cutter wheel allow spaces for the backward projecting parts of the bit-stock. The cutter blocks of the other set, indicated by G', are each provided, as shown in Fig. 39, with a plate g, a curved edge g', and bolt apertures $g^2$ similar to those above described on the carriers G. But the lug or enlargement outside of the wheel is here so arranged that the cutter cavity is radial to the wheel, as shown in Fig. 39. The cutter H' is similar in shape to those at H, but its stem lies in a horizontal position, that is, in a position parallel to the plane of rotation of the wheel.

The engines, the gearing, and the shafting, not only effect a rotation of the cutter wheel, but also the movement of the machine bodily in one direction or the other along the face of the material being cut.

At I—I' there are ropes, and at $I^2$—$I^3$ ropewinding drums each having one end of one of the ropes attached thereto. The other end of the rope is adapted to be made fast to some post, anchor or stationary object toward which the machine can be drawn. The winding drums are secured to the shafts $i$ which at their inner ends are mounted in bearings $i'$ carried by the bearing frames or blocks $I^4$ (Fig. 37) which are secured to the downward projections or bosses $a^2$ on the frame A, these bosses or projections $a^2$ being shown in Fig. 6. At their outer ends the drum shafts $i$ are mounted in bearings $i^2$ carried by the bearing block or frames $I^5$ (Fig. 38) which are secured to laterally projecting plates or platforms $a^3$. The shaft C' is provided with an eccentric J and an eccentric strap J', having the two ears or lugs $J^2$ arranged on the opposite sides thereof.

$l$ is a shaft mounted at its inner end in a bearing $l'$ in the block or frame $I^4$ and near its outer end in the bearing L' which is secured to the frame A.

M' is a gear wheel rigidly secured to the shaft $l$—$l$ and is adapted to mesh with the gear wheel $M^2$ rigidly secured to the drum shaft $i$.

M is a ratchet wheel rigidly secured to the shaft $l$.

L is a radius arm or pawl carrier mounted on the shaft $l$ and N is the pawl carried thereby and adapted to engage with the ratchet teeth on the wheel M.

K is a pitman detachably connected at one end to the pawl carrier 1 and at its other end to one of the ears of the eccentric strap J'.

$n$ (Fig. 34) is a spring adapted to hold the pawl N in yielding engagement with the teeth of the ratchet wheel M. When the eccentric J is rotating, it reciprocates the strap J' and through that and the pitman K the pawl is caused to effect a winding action upon the rope drum, and the rope is taken up in such way as to cause an advance of the machine.

At N' there is a pawl engaging with the ratchet wheel and acting to prevent retraction. This pawl is preferably yieldingly held in engagement with the ratchet teeth by means of a spring n' which is preferably made in the shape of a loop as shown. $n^2$ is a lateral projection or lug on the frame A with which the outer end of the spring loops n' is adapted to engage. $n^3$ is a laterally projecting handle on the said pawl. It will be seen that when it is desired to have this locking pawl in operation that it is merely necessary to press downward on the handle $n^3$ and force the spring loop to the under side of the lug or projection $n^2$ as shown in Fig. 2. When the disengagement of the pawl is desired the spring can be pressed to the upper side of the projection or lug $n^2$ and the pawl will be held out of engagement. At the other end of the machine there is a similar set of parts connected to the winding drum $I^3$. The radius arm L' of this set of parts can be connected to the eccentric strap by means of the pitman K, the latter being adapted to be disengaged from the strap and again connected up with either set of rope-winding devices. In order to regulate the speed of travel of the machine I provide for each ratchet and pawl mechanism a sliding plate K' (Fig. 30) which is seated in an aperture $k$ in the bearing frame $I^5$ and which is adapted to project through said frame and extend over the teeth of the ratchet wheel M.

$K^2$ is a set screw mounted above the aperture in the frame $I^5$ and adapted to extend into it and engage with the walls of the series of notches $k^2$ in the sliding bar K'. It will be seen that it is possible to adjust the bar K' so that the ratchet M' will be rotated a greater or less number of degrees in accordance with the number of teeth which the pawl N is permitted to advance at each reciprocation of the pitman K.

The frame is supported by means of wheels O, upon a track O'. These wheels are in line with each other, this being the only line of support for the mechanism outside of the coal. The frame and all the parts supported thereby can be adjusted upon these wheels in a peculiar manner. Each wheel has a shaft or axle $p$ which is mounted in a yoke or stirrup-like carrier P (Figs. 15 and 16). This is mounted at $p'$ in the main frame or in a supplemental frame piece P' (Figs. 19 and 20) secured to the main frame. The wheel carrier has arms $p^2$ with recessed hooks $p^3$.

Q (Fig. 21) is an adjusting bolt, the threaded part of which engages with a rocking nut Q' (Fig. 17) having trunnions $q$ which engage with the hooked arms $p^2$ of the wheel-carrier.

At $q'$ there is an enlargement or head on the adjusting bolt Q, this being preferably convex and seated in a cavity at $p^4$ in the end of the frame piece P'. The concave cavity in which the head of the adjusting bolt is seated is preferably formed in a bushing $p^5$ (Fig. 18) which is fitted into an aperture in the frame piece. By applying a wrench to the end of the adjusting bolt, it can be turned in such a way as to swing the wheel carrier and raise and lower the end of the machine relative to the wheel. By these devices the mechanism can be tilted, one end relatively to the other, so as to vary in relation to the horizontal, the line of the cut made by the cutter wheel. As the exposed ends or heads of the adjusting bolts Q are situated at the ends of the machine, and since the bolts are substantially horizontally disposed, they are easily accessible for adjustment. The wheels and their carriers are arranged below the cylinders B, which extend beyond the platform-like parts $a$ of the bed frame, this arrangement reducing the length of the machine and bringing the wheels well under the parts they are to support, while at the same time leaving exposed and in easily accessible positions the parts by which the vertical adjustments of the frame are effected.

The cutter wheel, it will be seen, is mounted midway between the ends of the machine as a whole, and is adapted for use when the machine is moving in either direction, it being merely necessary to reverse the cutters to correspond to the line of advance.

The reversal of the engines may be accomplished in any well known manner. In the drawings I have shown the valve stems R, R of the engines connected to eccentrics S, S which are loosely mounted on the engine shafts B', B'. The eccentric disks T, T (Fig. 26) are keyed to the said engine shafts, each eccentric disk having a concentric slot $t$ through which the bolt which clamps the eccentric to its disk extends. In order to reverse the engines their eccentrics may be shifted across the face to their respective disks and clamped in the reversed position. For a more detailed description of the mechanism herein indicated, for reversing the engine, reference may be made to Patent No. 878,976, issued February 11, 1908, to E. R. Merrill for mining machines.

In order to prevent the operative parts of the engine from becoming clogged with particles of coal, dirt and other substances which are thrown outward by the cutter wheel when in operation, and to prevent dust from settling upon the working parts of the engine, I provide covers or shields U, one for each engine, which extend from the lower front edge of the engine frame upward over the crank disks and then horizontally rearward as shown in Figs. 2, 3 and 4. These covers or shields are held in position by means of clips $u$ which are mounted on the air-inlet pipe V which is secured to the machine above the valve chests of the engines.

$u'$ are handles by means of which the operator can swing the covers or shields upwardly and rearwardly in order to have access to the moving parts of the engine. Another pair of covers or shields U', U' extend rearwardly from the air pipe V to which they are likewise pivoted by means of clips $u^3$. At their outer ends these covers or shields rest upon the cover supporting frames W which are secured to frame A of the machine. It will be seen that the covers or shields U' are likewise swingable about the air pipe V in order to permit access to the mechanism beneath them.

By arranging the engines in alinement, as shown in the drawings, a relatively narrow and low machine is obtained which is especially desirable for use in long wall work. The present construction also permits of the operation of the machine in either direction, and as the engines are in alinement with each other and on opposite sides of the crank shaft and have their cranks at 90 degrees to each other, the vibration of one engine will be more or less compensated for by the vibrations of the other, so that a very evenly running machine is obtained.

All the similar parts of the machine which are secured or mounted on opposite ends of the frame A are duplicates. Therefore but one set of patterns is required for the making of these parts and the similar parts are interchangeable at will.

It will be noted that the engines are so related to the main shaft C' that, when desired, one of them can be disconnected and the machine operated by means of the other alone. The machine herein shown being designed to have each engine of such power that it can operate the cutter wheel independent of the other engine. This feature is of particular importance in case of breakage or accident to the parts at one end of the machine.

The relative position of the main shaft C' vertically below the engine shaft B', B' by which it is driven, enables the use of the desired size of driving pinions $C^2$, and at the same time providing a low down machine distributing the stress and strains on the main shaft C' and upon the frame evenly.

The method of supporting the quadrant plate or frame E is an essential feature of the applicant's construction. By supporting the plate on lugs projecting from the sides of the frame, as shown, rather than by bolting the plate to the under edge of the frame, as has formerly been done, not only is it possible to adjust the bits on the cutter wheel to cut a wider kerf, but also the wheel may be more quickly and readily detached from the frame. Furthermore since thrust on the wheel is normally downwardly, the danger of stripping the threads of the bolts which support the quadrant plate, incident to the construction in which the quadrant plate bears downward on the bolt heads, is avoided by applicant's construction, and the machine may be worked closer to the coal.

What I claim is:

1. In a mining machine, the combination of the relatively long bed frame, the reciprocating engines secured to the opposite ends thereof having their connecting rods arranged in the same vertical plane, the crank shafts for the engines transversely mounted in bearings on the said bed frame arranged near the center thereof, the main power shaft likewise transversely mounted in bearings on the said frame, the driving gearing between the crank shaft and the said power shafts, the laterally projecting cutter wheel mounted centrally of the frame, and the bevel drive gear secured to the main power shaft and adapted to drive the said cutter wheel, substantially as set forth.

2. In a mining machine, the combination of the relatively long bed frame, the opposed reciprocating engines mounted at the opposite ends thereof and having their cylinders arranged in the same vertical plane, the parallel crank shafts for the engines transversely mounted in bearings on the said frame arranged near the center thereof, the main power shaft mounted in bearings below the crank shafts and having its axis of rotation in a vertical plane midway between the vertical planes of the axes of rotation of the crank shafts, the driving gearing between the crank shafts and the driving shaft, a laterally projecting cutter wheel mounted centrally of the frame, and a beveled drive gear secured to the main power shaft and adapted to drive said cutter wheel, substantially as set forth.

3. In a mining machine, the combination of the relatively long bed frame, the opposed reciprocating engines secured to the opposite ends and on the same side thereof, the transverse crank shafts for the engines mounted in bearings secured near the center of said frame, the cranks on the said crank shafts arranged in the same vertical plane, the main power shaft mounted transversely in bearings at the center of said bed frame and below the said crank shafts, a laterally projecting cutter wheel mounted centrally of the bed frame, and the pinion secured to the said driving shaft and adapted to drive said cutter wheel, substantially as set forth.

4. In a mining machine, the combination of the relatively long bed frame, the reciprocating engines secured to the opposite ends thereof arranged in the same vertical and horizontal planes and provided with transverse crank shafts mounted in bearings secured near the center of the said bed frame, the transversely mounted power shaft having its axis of rotation in planes parallel to the vertical and longitudinal planes of the axes of rotation of the said crank shafts, the driving gear secured to the said driving shaft, the driving pinions one on either crank shaft and adapted to mesh with said driving gear, the laterally projecting cutter wheel, and the pinion secured to the main driving shaft and adapted to drive said cutter wheel, substantially as set forth.

5. A cutter wheel for mining machines having a peripherally grooved rim, the flanges on either side of said groove having notches adapted to receive the shank of the bit, and bit holders having their shanks inserted in said groove detachably secured to the said rim, substantially as set forth.

6. A cutter wheel for mining machines, comprising a circularly racked wheel having a peripherally grooved rim and tool holders having shanks inserted into said groove, and pins detachably securing each of said shanks to the rim independently of each other whereby each tool holder may be detached from the said rim without detaching any of the others.

7. In a mining machine of the class described, the combination with a bed frame, the supports therefor, the opposed engines arranged at either end of said frame, the laterally projecting cutter wheel, the power-transmitting mechanism interposed between said engines and said cutter wheel, the winding drums mounted, one at either end of said frame, the pawl and ratchet mechanism associated with each of said drums, the eccentric J driven by said power-transmitting mechanism, the eccentric strap thereon, and the interchangeable pitman adapted to connect said eccentric strap with either of said ratchet and pawl mechanisms.

8. In a mining machine, the combination of a relatively long narrow bed frame, two opposed reciprocating engines having the axes of their cylinders in longitudinal alinement at the side of the frame arranged to be next to the coal face and each secured to said frame near one end thereof, a laterally projecting cutter wheel mounted centrally between said cylinders, a main power shaft mounted transversely in the bed-frame and having its axis in the vertical transverse plane containing the axis of the said cutter wheel, a drive gear secured to the main power shaft and arranged to drive the said cutter wheel, the crank shafts of said engines being arranged at opposite sides of said main shaft, and power transmitting mechanism similarly connecting each of said crank shafts with said main power shaft and arranged on the opposite side of the vertical longitudinal plane containing the axes of the engine cylinders from the said drive gear.

9. In a mining machine, the combination of a relatively long narrow bed frame, two opposed reciprocating engines having the axes of their cylinders in the same horizontal plane and their crank shafts arranged parallel to each other and mounted transversely in the bed frame near the center thereof, each of said cylinders being secured to said bed frame near one end thereof, a laterally projecting cutter wheel mounted centrally between said cylinders, a main power shaft mounted transversely in the bed frame and having its axis in the vertical transverse plane containing the axis of the said cutter wheel and equally distant from the axes of the said crank shafts, a drive gear secured to the main power shaft and arranged to drive the said cutter wheel, and power transmitting mechanism connecting each of said crank shafts with said main power shaft and arranged on the opposite side of the vertical longitudinal plane containing the axes of the engine cylinders from the said drive gear.

In testimony whereof I affix my signature in presence of two witnesses.

FRANK L. SESSIONS.

Witnesses:
C. L. McConkey,
J. G. Chandler.